United States Patent
Dunn, Jr.

[15] 3,683,590
[45] Aug. 15, 1972

[54] DUAL FLUE CONDENSER

[72] Inventor: Wendell E. Dunn, Jr., 12 Trelawney St., Woollahra, Australia

[22] Filed: April 29, 1971

[21] Appl. No.: 138,468

Related U.S. Application Data

[63] Continuation-in-part of Ser. No. 138,462, April 29, 1971.

[52] U.S. Cl. .............................55/71, 23/87, 23/89, 55/222
[51] Int. Cl. ......................B01d 53/00, B01d 34/00
[58] Field of Search ......23/87, 89; 55/27, 71, 72, 84, 55/89, 220, 222, 240, 261, 262

[56] References Cited

UNITED STATES PATENTS

| | | |
|---|---|---|
| 2,184,884 | 12/1939 | Muskat et al............23/87 T X |
| 2,184,885 | 12/1939 | Muskat et al............23/87 T X |
| 2,675,891 | 4/1954 | Frey............................55/72 X |
| 2,718,279 | 9/1955 | Kraus.........................55/71 X |
| 2,747,987 | 5/1956 | Daubenspeck et al..23/87 R X |
| 2,762,700 | 9/1956 | Brooks.....................23/87 R X |
| 2,933,373 | 4/1960 | Love et al. ..............23/87 R X |
| 2,940,827 | 6/1960 | Groves....................23/87 R X |
| 3,294,482 | 12/1966 | Lerner........................55/71 X |

Primary Examiner—Reuben Friedman
Assistant Examiner—R. W. Burks
Attorney—Samuel V. Abramo

[57] ABSTRACT

Claimed is a process for condensing iron chlorides from a gaseous stream in two-steps, the first step being the cooling of the gases to about 675° C. to condense ferrous chloride as a liquid and leaving a gas ferrous residual and then in the second step adding chlorine gas and sodium chloride salt separately wherein the remaining $FeCl_2$ is oxidized to $FeCl_3$ which with the initial $FeCl_3$ is converted to $NaFeCl_4$ and cooling that product to a temperature above 159°C.

This process is useful for recovering iron chlorides from a gaseous effluent to minimize air pollution.

4 Claims, 1 Drawing Figure

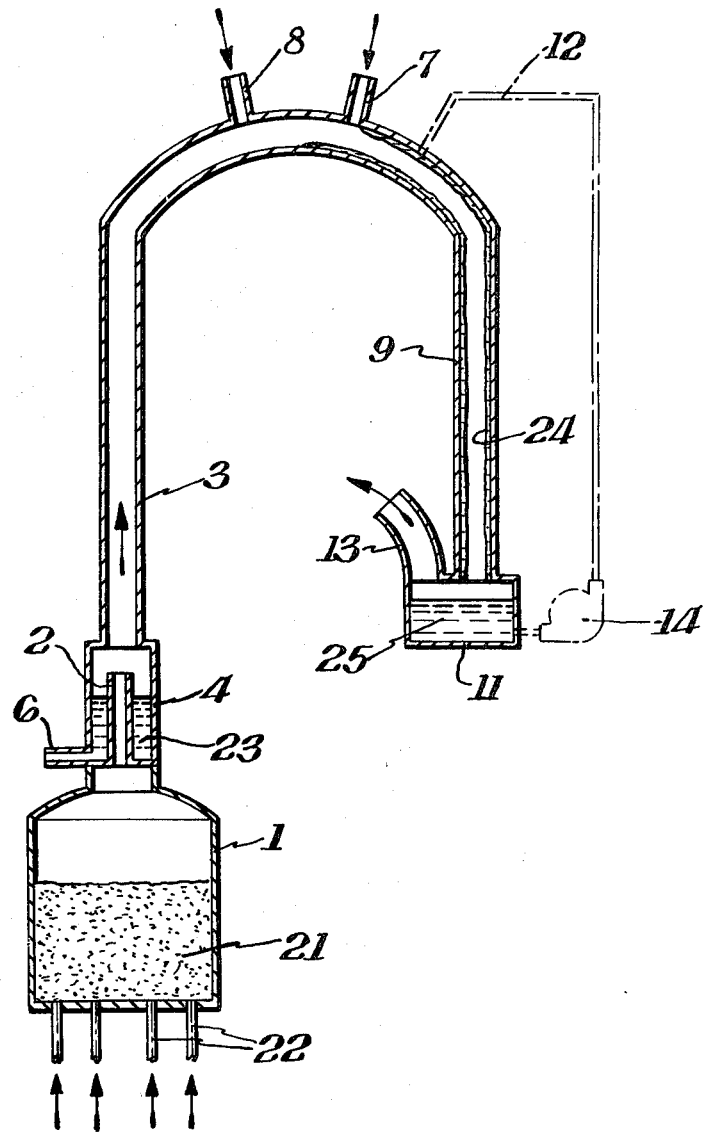
INVENTOR
Wendell E. Dunn, Jr.
BY
Samuel V. Abramo
ATTORNEY

DUAL FLUE CONDENSER

CROSS-REFERENCES TO RELATED APPLICATIONS

This invention is a continuation in part of my copending patent application Ser. No. 138,462, filed Apr. 29, 1971, entitled "Annular Flow Condenser."

BACKGROUND OF THE INVENTION

This invention relates to a process for collecting iron chlorides from a gaseous mixture.

SUMMARY OF THE INVENTION

This invention is directed to a process for removing gaseous iron chlorides from a mixed gas stream by first condensing a substantial amount of ferrous chloride from the gas stream and then insuring complete recovery of iron chlorides by converting the remaining ferrous chlorides to ferric chlorides and collecting the ferric chlorides as a liquid complex of ferric chloride and an alkali metal chloride. The process of this invention is useful for collecting by-product iron chlorides present in the gas stream from a chlorinator employed to beneficiate titaniferrous ores and to prevent the air pollution normally associated with such processes.

DESCRIPTION OF THE PREFERRED EMBODIMENT

The beneficiation of titaniferrous ores using chlorine, for instance, as described by Muskat et al. in U.S. Pat. No. 2,184,884 produces a gaseous stream containing varying amounts of vaporized ferric chloride and ferrous chloride along with carbon dioxide, nitrogen, etc. Removal of the iron chlorides from this gas stream is desirable not only from an air pollution standpoint, but also from an economical point of view since it is worthwhile to reclaim the iron chlorides for both the chlorine content as well as the iron content. Condensing the ferric chloride as a liquid complex is also useful since it has been found to be difficult to condense ferric chloride on a commercial scale due to the fact that it is appreciably volatile at the melting point which causes plugging of the condenser and associated piping.

It is an object of this invention to eliminate these difficulties and provide a process which removes all of iron chlorides from the gas stream economically and without plugging of the gas passages. Other objects of the invention will be obvious from the following description.

The process which is the subject matter of this invention comprises first condensing a large portion of the ferrous chloride from the gas stream by cooling and then chlorinating essentially all of the remaining ferrous chloride in the gas stream with chlorine to form ferric chloride. The ferric chloride is then reacted with sodium chloride and ferric chloride which is cooled to a temperature in the range of 200° to 160° C, collected as a liquid and recycled in the second stage of the process. The complex of ferric chloride and sodium chloride has a melting point of 159° C which is well below that of either ferric chloride or sodium chloride. It also has vapor pressure of 2.7mm Hg at 560° C which is very much lower than either of its components and unexpectedly is both stable and easily formed at high temperatures. These characteristics make it very useful in the second stage of the process.

Attention is directed to the FIGURE of the drawing which shows a typical dual flue apparatus in which a chlorination reactor 1 equipped with a plurality of inlet tubes 22 for chlorine. The reaction of a fluidized mixture of particulate titaniferous ore and carbon 21 with chlorine produces vaporized iron chlorides, carbon dioxide, nitrogen and other gases which are fed through the top discharge 2 into the first stage 3 of the dual flue cooler. A portion of the iron chlorides, mainly ferrous chloride 23 is condensed in this first stage and collected in receiver 4 and discharged through pipe 6. NaCl is introduced into the gases at the top portion of the dual flue through inlet 8 as is $Cl_2$ at inlet 7. Remaining iron chlorides are condensed as $NaFeCl_4$ in the second stage 9 and $NaFeCl_4$ 25 is collected as a liquid in receiver 11 which optionally can be recycled, by means of a pump 14 through line 12 to the beginning of the second stage. The interior of the second stage 9 is coated with a ligand $NaFeCl_4$ layer 24. Exhaust gases such as $CO_2$, $N_2$ etc. are discharged through outlet 13.

By constructing the flue vertically the process has the advantages of my copending application filed simultaneously herewith entitled "Annular Flow Condenser" of which this invention is a continuation-in-part.

The operation of the process is governed by the boiling points of ferrous chloride, ferric chloride and $NaFeCl_4$, which are as follows:

|  | Melting Point | Boiling Point |
| --- | --- | --- |
| Ferrous chloride | 677°C | 950°C |
| Ferric chloride | 305°C | 309°C |
| $NaFeCl_4$ | 159°C | 500°C |

The materials of construction of the dual flue cooler may be stainless steel, brick lined steel or even black iron, provided care is exercised in operation to keep metal surfaces cooled sufficiently so that a solid chloride protective layer attains. In one example of the invention the chlorinator had an inside diameter of 5.5 feet and fed the hot gases from the reactor into a vertical section of flue 20 feet high and of 6 inches inside diameter. Chlorine was fed into the fluidized reactor at a rate of 59 SCFM and air at 89 SCFM and a mixture of 20 percent coke and 80 percent titaniferous ore of approximately 55 percent $TiO_2$ and 43 percent FeO was chlorinated at 1,025° C. Gas leaving the reactor was at 980° C. The first stage of the flue was air cooled and had a skin temperature of 725° C to 710° C at its lower end. The gases in the first stage lost the majority of ferrous chloride as condensate before reaching the top of the first flue, skin temperatures of the second flue ranged from 450°–250° C and quantities of $NaFeCl_4$ where condensed in the second stage. Since the reaction $FeCl_2 + \frac{1}{2}Cl_2 = FeCl_3$ is reversible as well as exothermic, advantage in pushing the reaction to completion is gained by converting $FeCl_3$ to $NaFeCl_4$ and also by removing heat of reaction in the condenser. Thus, improvement was noted when water was applied to the outside of the second flue to promote heat removal. In the first flue, condensation of ferrous chloride can also be accelerated by providing cooling fins or water cooling to the outside of the first stage.

This invention is useful for recovering both ferrous and ferric chloride not only to minimize air pollution but also to permit recovery of chlorine. The process can be practiced by placing the second stage directly above the first in a single continuous flue in which case the NaFeCl$_4$ would reflux at about the mid-point.

In some cases where the reactor produces gases having a higher FeCl$_3$ concentration, chlorine need not be added to the flue and there will be sufficient NaFeCl$_4$ in which to dissolve FeCl$_2$ and remove it from the gas stream as FeCl$_2$ without being oxidized to FeCl$_3$. FeCl$_3$ formed in the reactor will react with NaCl added to the flue to form NaFeCl$_4$ and in addition some FeCl$_3$ will dissolve in liquid NaFeCl$_4$, thereby removing all iron chlorides from the gas stream either by reaction or dissolution.

The foregoing embodiment has been given for clarity of understanding only and no limitations are to be understood therefrom since the invention is not limited to the exact details shown and described and obvious modifications will occur to those skilled in the art.

The embodiments of the invention in which an exclusive property or privilege is claimed are defined as follows:

1. In a process for recovering gaseous iron chlorides the method of condensing said gases in two steps wherein the first step comprises condensing ferrous chloride in a flue having external cooling means and the second step comprises adding sodium chloride to form a complex of sodium iron chloride which is condensed in a second externally cooled flue.

2. A process for recovering iron chlorides from a gas stream having a temperature above 980° C comprising passing said gas stream through an externally cooled first flue to reduce the temperature of the gas stream to 675°–900° C, collecting liquid ferrous chloride from said first flue and then cooling the residue of the gas stream in a second externally cooled flue while contacting said gas stream with chlorine to oxidize residual to chloride in the gas stream and adding sodium chloride ro form a sodium chloride-ferric chloride complex.

3. A process for removing iron chlorides from a gas stream containing other gases in addition to ferrous chloride when said gas stream is at a temperature above 980° C comprising initially cooling said gas stream to a temperature between 980° C and 675° C, removing liquid ferrous chloride and then further cooling said gas stream while contacting it with chlorine and sodium chloride or a sodium chloride-ferric chloride complex salt.

4. A process for condensing iron chlorides from a mixed gas stream at 980° – 1100° C comprising first cooling the gas stream to 675° – 900° C, adding chlorine and sodium chloride or a sodium chloride-ferric chloride complex salt and cooling to 675° – 185° C.

* * * * *